United States Patent Office 3,452,901
Patented July 1, 1969

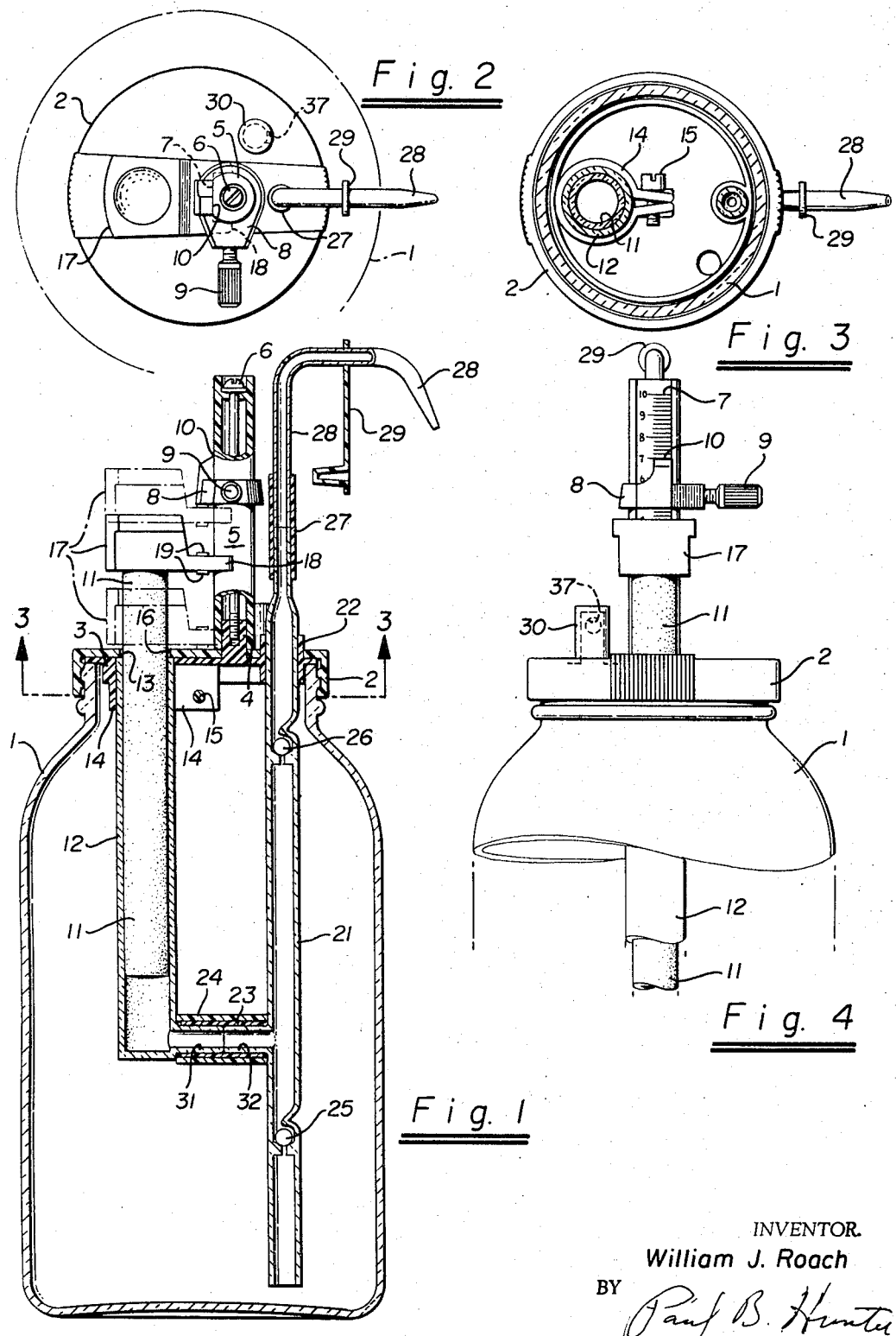

3,452,901
LIQUID DISPENSING DEVICE
William J. Roach, Hayward, Calif., assignor to Oxford Laboratories, San Mateo, Calif., a corporation of California
Filed Dec. 1, 1967, Ser. No. 687,372
Int. Cl. B67d 5/22, 5/42; F04b 21/02
U.S. Cl. 222—49     3 Claims

ABSTRACT OF THE DISCLOSURE

A dispensing device for accurately dispensing liquids having a plunger snugly fitting into and vertically movable within a cylindrical barrel, the upper edge of the barrel providing a sharp edge for scraping sediment from the plunger whenever the latter is depressed within the barrel, the barrel projecting downwardly through a supporting cap on top of a container such as a glass jar, a vertical tube extends within the glass jar and outwardly through the cap, valves below and above a transverse outlet in the tube that is connected to the bottom of the cylindrical barrel, the upper end of the tube being provided with a delivery tip, the cap carrying a scale with an adjustable stop member for limiting the movement of the plunger to measure any desired quantity of liquid to be dispensed.

---

This invention relates generally to devices for accurately dispensing quantities of liquid, and the invention has reference more particularly to a novel dispensing device of the pipette type.

Liquid dispensing devices of the pipette type as heretofore produced have been objectionable in that they tend to collect sediment on their operating plungers, which, owing to the structure of prior art pipettes, tends to cause the plungers to bind eventually in their barrels. Also, devices as heretofore constructed ofttimes require the user to return the same to the supplier or manufacturer to thoroughly cleanse the dispenser at regular intervals in order that the same may remain operable. Furthermore, such prior art devices generally have the major portion of the measuring apparatus projecting above the bottle or other liquid container containing the liquid to be dispensed, resulting in frequent breakage, necessitating the expense replacement of major parts of the device. In addition, such external mounting of the operating parts of the device necessitates careful handling and prevents easy storage of the same.

The principal object of the present invention is to provide a novel accurate liquid dispensing device of the pipette type that eliminates the above-recited deficiencies and has the major portion of its operating structure contained within the bottle or other liquid container used, whereby the major parts of the device are protected against direct contact with external objects which would otherwise tend to break or damage the dispensing device, as during handling.

A feature of the present invention is to provide a novel liquid dispensing device of the above character that is made up of components so constructed and arranged that they can be readily dismounted, enabling the device to be taken apart and cleaned by the user without the necessity of returning the same to the supplier or manufacturer.

Another feature of the present invention is to provide a novel liquid dispensing device of the above character that is of rugged, simple structure, which has a low profile so as to reduce space requirements in refrigerators and cabinets, and that is so constructed as to be capable of relatively long use without the necessity of cleaning.

These and other features and advantages of the present invention will be more apparent after a perusal of the following specification taken in connection with the accompanying drawings wherein:

FIG. 1 is a part vertical sectional view of the novel liquid dispensing device;
FIG. 2 is a plan view of a portion of the structure of FIG. 1;
FIG. 3 is a sectional view taken along the line 3—3 of FIG. 1 and
FIG. 4 is a fragmentary side view of the structure of FIG. 1.

Similar characters of reference are used in the above figures to designate corresponding parts.

Referring now to the drawings, the reference numeral 1 designates a glass bottle or other container having a threaded top portion upon which a cap structure comprising an outer cap 2, as of polypropylene, is adapted to be screwed. The cap structure also includes an inner cap 3 contained within the outer cap 2 and in abutting relation thereto, said inner cap having a peripheral lip extending over the top edge of the bottle 1 in sealing relation and confined therebetween and the inner surface of the outer cap 2. Inner cap 3 is provided with an upwardly extending boss 4 that projects through an opening in the outer cap and into the interior of a hollow upwardly extending scale post 5 that is closed at its upper end and apertured to receive a central post mounting screw 6 that extends downwardly within the scale post 5 and is threaded into a central aperture provided in the inner cap boss 4, thereby retaining the scale post 5 and the inner cap 3 assembled with the outer cap 2.

The scale post 5 is provided with a graduated volume scale 7 inscribed on the exterior wall thereof. An indicator stop member 8 surrounds and is adjustable along the length of scale post 5 and is adapted to be secured in any desired vertically adjusted position by means of a tightening screw 9 threaded thereinto and abutting scale post 5. Indicator stop member 8 is provided with an upstanding boss having a knife edge 10 for reading the position of the stop against the scale 7, to thereby indicate the amount of liquid to be dispensed at any time.

Pumping of the dispensed liquid is accomplished through the use of a hollow glass cylindrical plunger 11 that is ground to the same diameter for substantially the full length thereof to great accuracy. This ground glass plunger 11, which is closed at its lower end, preferably has a slight inward taper at its lower end portion to facilitate easy entrance of the same into its cooperating barrel 12. Barrel 12 extends vertically within the bottle 1 and the inner surface of this barrel is truly cylindrical throughout its length and has no upper edge bevel as is customary in pipettes, but instead is square at its upper end at 13, providing a sharp transverse edge which scrapes any sediment or residue lodged on plunger 11 therefrom each time the plunger moves downwardly in use, so that such residue is prevented from binding the plunger 11 in the cylindrical barrel 12, which would otherwise render the device useless and require immediate cleaning. Pipette barrels as heretofore constructed are bevelled at their inner upper ends to facilitate the insertion of the plunger, but such bevels become lodging place for residue resulting from evaporation of the liquid used in the device and soon necessitate the servicing of the pipette. Also, in the past, the plungers have been generally recessed near their tops adjacent the actuating handle which collects additional sediment and is harmful since residue collecting below the handle will cause binding and prevent full insertion of the plunger. The plunger 11 of this invention, being of uniform diameter throughout its length, does not collect sediment, thus enabling the device to be used for long periods of time without the necessity of recleaning.

The barrel 12 is retained in position on the inner cap 3 with its top squared edge abutting the under surface of the outer cap 2 and adjacent an opening 16 in the outer cap by means of a split sleeve or flange 14 formed on the inner cap and depending therefrom. Sleeve 14 is held in gripping relation with the upper portion of the barrel 12 by means of a tightening screw 15 passing through inwardly directed flanges provided on the sleeve 14. An operating handle 17 is attached to the upper end of plunger 11 and has a projecting bifurcated portion 18 that engages scale post 5 in sliding relation, the bifurcation of this projecting portion serving to prevent the turning of plunger 11 about its longitudinal axis. The bifurcated projection 18 has small upper and lower bosses 19 for abutting the indicator stop 8 and outer cap 2 respectively to limit the vertical movement of the plunger 11.

The lower end portion of the barrel 12 is formed with a transversely extending tubular stem 31 that is adapted to abut a similar stem 32 provided on an upstanding glass tube 21 that extends parallel to the barrel 12 and projects through an entrance sleeve 22 provided on the inner cap 3, which sleeve projects through a conforming aperture in the outer cap 2. A connector sleeve 23, as of Teflon, interconnects the two tubular stems 31 and 32 in sealing relation, and a surrounding spacer sleeve 24, also preferably of Teflon, spaces the glass tube 21 with respect to barrel 12 so that these members extend parallel to each other. The glass tube 21 is provided with lower and upper ball valves 25 and 26 below and above the tubular stems 31 and 32. The upper end portion of the upstanding glass tube 21 exteriorly of the outer cap 2 is reduced in diameter and connected by a Teflon connector 27 to a glass delivery tip 28 which is suitably bent over at its upper free end portion for discharging liquid into a suitable container, the free end portion of this delivery tip being suitably reduced, as shown. A delivery tip cap 29, preferably of flexible plastic, is adapted to be inserted over the free end of delivery tip 28 when the dispensing device is not in use, to prevent the ingress of air and the egress of liquid.

In use, to dispense a definite quantity of liquid from the container 1, the indicator stop 8 is set with its upper knife edge 10 registering with the desired amount of liquid as indicated on the scale post 5, whereupon the plunger 11 is raised from its lowest position by raising the operating handle 17 until the bifurcated projection thereon abuts the under surface of the indicator stop 8, such raising of the handle causing the plunger 11 to draw liquid from within container 1 upwardly past valve 25 and into barrel 12. The subsequent depression of operating handle 17 will force liquid out of barrel 12 past tubular stems 31 and 32 and upwardly within glass tube 21, past valve 26, and out through the delivery tip 28. In practice, the entire glass tube 21 is normally substantially filled with liquid, but ball valve 26 prevents this liquid from flowing downwardly into the lower portion of the glass tube 21 when the plunger 11 is raised.

A hollow cylindrical vent 30 is formed on the outer cap 2 and extends upwardly therefrom for suitable attachment to filtering and/or drying devices, the said vent 30 having an aperture 37 into which tubing may be inserted for this purpose, a suitable hose being attached to the tubing in use. Preferably, the upper portion of plunger 11 is given a silicone coating occasionally which not only facilitates the movement of the plunger within its barrel but also helps to seal the same in use. Any deposited residue collecting upon the upper portion of the plunger 11 in use is removed by the sharp edge 13 of the barrel whenever the plunger is depressed, whereby the dispensing device of this invention may be used for long periods of time without cleaning. When it is desired to disassemble the device for cleaning, this can be done readily by the user by initially removing the post mounting screw 6 so that the scale post 5 can be removed and also the inner cap 3 separated from the outer cap 2; loosening screw 15 will enable the disconnection of delivery tip 28 from glass tube 21, and this tube in turn can be separated from the barrel 12 by removing the spacing sleeve 24 and the connector sleeve 23. Thus, the parts can be separated and cleaned or autoclaved.

Thus it will be seen that the novel liquid dispensing device of the present invention not only inherently prevents the collecting of deposited material on the plunger 11, but also, should such material eventually tend to collect in the barrel or other parts of the device, the same can be readily taken apart and cleaned by the user without returning the same to the factory or other servicing agent.

Since many changes could be made in the above construction of the novel liquid dispensing device of this invention and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A liquid dispensing device comprising a cap structure adapted to be threaded upon the top of a liquid container, a cylindrical barrel for extending vertically within the container and having its upper end portion attached to said cap structure, said barrel being of uniform diameter throughout its length and having its upper end open, a plunger for conformably fitting the interior of said barrel and slidable therein, said plunger also being of uniform diameter whereby there are no pockets in the opposing surfaces of said barrel and plunger to accumulate harmful deposited material resulting from evaporation of liquid from the surface of said plunger, a vertical scale post affixed to said cap structure and extending upwardly therefrom and provided with a reference scale, an indicator stop member adjustable along said reference scale, an operating handle attached to the top of said plunger and cooperating with said scale and said stop member, the latter serving to limit the upward movement of said plunger to thereby determine the quantity of liquid drawn into said barrel from said container during upward movement of said plunger, a vertically extending tube within said container connected to said barrel and carried by said cap structure, said tube extending through said cap structure, a delivery tip provided on said tube exteriorly of said cap structure, spaced valves within said tube whereby liquid drawn into said barrel upon upward movement of said plunger is forced out through said delivery tip upon downward movement of the same, said cap structure comprising an outer cylindrical cap having internal threads for securing the same to a liquid container and an inner cap having a peripheral flange adapted to be bound between the top of the container and the inner surface of said outer cap for sealing said device in use, said inner cap having a depending split sleeve for surrounding and supporting said barrel within the container, and an upwardly extending boss formed on said inner cap, said outer cap having conforming apertures for accommodating said plunger and said boss, said scale post being removably attached to said boss and said inner cap having an integral sleeve for removably supporting said vertically extending tube, said outer cap being apertured to accommodate said integral sleeve.

2. A liquid dispensing device as defined in claim 1 wherein the lower end of said barrel is formed with a tubular stem, said vertically extending tube being similarly provided with an aligned tubular stem, and removable sealing and spacing sleeve members for interconnecting said stems, said tube valves being positioned respectively above and below the tubular stem of said vertically extending tube, whereby liquid forced from said barrel in use can only rise within said vertically extending tube to be forced through said delivery tube.

3. A liquid dispensing device comprising a cap structure adapted to be threaded upon the top of a liquid container, a cylindrical barrel for extending vertically within the container and having its upper end portion attached to said cap structure, said barrel being of uniform diameter throughout its length and having its upper end open, a plunger for conformably fitting the interior of said barrel and vertically slidable therein, said plunger also being of uniform diameter whereby there are no pockets in the opposing surfaces of said barrel and plunger to accumulate harmful deposited material resulting from evaporation of liquid from the surface of said plunger, said barrel providing an annular sharp transverse upper edge for scraping off such material lodged on said plunger each time the latter is moved downwardly, a vertical scale post affixed to said cap structure and extending upwardly therefrom and provided with a reference scale, an indicator stop member adjustable along said reference scale, an operating handle attached to the top of said plunger and cooperating with said scale and said stop member, the latter serving to limit the upward movement of said plunger to thereby determine the quantity of liquid drawn into said barrel from said container during upward movement of said plunger, a vertically extending tube within said container connected to said barrel and carried by said cap structure, said tube extending through said cap structure, a delivery tip provided on said tube exteriorly of said cap structure, and spaced valves within said tube respectively above and below the connection of said tube with said barrel, whereby liquid drawn into said barrel upon upward movement of said plunger is forced out through said delivery tip upon downward movement of the same.

References Cited

UNITED STATES PATENTS

| | | | |
|---|---|---|---|
| 1,000,965 | 8/1911 | Davis | 222—43 |
| 2,798,647 | 7/1957 | Broadwin | 222—50 |
| 3,118,568 | 1/1964 | Bishop et al. | 222—43 |
| 3,143,252 | 8/1964 | Shapiro | 222—309 |

ROBERT B. REEVES, *Primary Examiner.*

H. S. LANE, *Assistant Examiner.*

U.S. Cl. X.R.

103—204; 222—148, 385